United States Patent
Bordogna et al.

(10) Patent No.: US 12,177,003 B2
(45) Date of Patent: Dec. 24, 2024

(54) METHOD AND APPARATUS FOR DATA PLANE CONTROL OF NETWORK TIME SYNC PROTOCOL IN MULTI-HOST SYSTEMS

(71) Applicant: Intel Corporation, Santa Clara, CA (US)

(72) Inventors: Mark Bordogna, Andover, MA (US); Srinivasan S. Iyengar, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 17/205,869

(22) Filed: Mar. 18, 2021

(65) Prior Publication Data

US 2021/0211214 A1 Jul. 8, 2021

(51) Int. Cl.
*H04J 3/06* (2006.01)
*H04L 43/106* (2022.01)
*H04L 69/28* (2022.01)

(52) U.S. Cl.
CPC .......... *H04J 3/0673* (2013.01); *H04J 3/0667* (2013.01); *H04L 43/106* (2013.01); *H04L 69/28* (2013.01)

(58) Field of Classification Search
CPC ...... H04J 3/0635; H04J 3/0638; H04J 3/0644; H04J 3/0647; H04J 3/065; H04J 3/0658; H04J 3/0661; H04J 3/0667; H04J 3/0673; H04J 3/0685; H04L 43/106; H04L 69/28

See application file for complete search history.

(56) References Cited

U.S. PATENT DOCUMENTS

| | | | |
|---|---|---|---|
| 7,613,212 B1 | 11/2009 | Raz et al. | |
| 8,718,482 B1 * | 5/2014 | Roberts | H04B 10/27 398/53 |
| 10,084,559 B1 * | 9/2018 | Devineni | H04J 3/0661 |
| 10,122,484 B1 | 11/2018 | Kasichainula | |
| 10,164,759 B1 | 12/2018 | Volpe | |
| 10,727,966 B1 * | 7/2020 | Izenberg | H04J 3/0676 |
| 10,944,818 B1 * | 3/2021 | Izenberg | H04L 43/067 |
| 11,063,738 B1 * | 7/2021 | Wang | H04L 7/0008 |

(Continued)

OTHER PUBLICATIONS

Extended European Search Report for Patent Application No. 22153241.9, Mailed Jul. 20, 2022, 9 pages.

*Primary Examiner* — Kevin D Mew
(74) *Attorney, Agent, or Firm* — Compass IP Law PC

(57) ABSTRACT

Methods and apparatus for data plane control of network time sync protocol in multi-host systems. A network interface controller (NIC) is configured to implement a network data plane that is associated with a software-based control plane implemented in the multi-host system. The NIC includes a primary timer and secondary timers at distributed endpoints such as network ports. The NIC receives network time packets having network timestamps and employs a secondary timer to associate a local timestamp with the packets. The network and local timestamps are compared by a network intellectual property block (network IP) in the data plane datapath to adjust the primary and secondary timer(s) to match the network time. The network IP uses a 2-bit wire protocol to increment and/or decrement the primary and secondary timer(s) that enables the timers to be adjusted with a nanosecond granularity.

20 Claims, 7 Drawing Sheets

(56) References Cited

U.S. PATENT DOCUMENTS

| | | | |
|---|---|---|---|
| 2004/0177162 A1* | 9/2004 | Wetzel | H04L 9/40 709/236 |
| 2011/0228768 A1* | 9/2011 | Gelter | H04N 21/4344 370/389 |
| 2012/0106576 A1* | 5/2012 | Hadzic | H04J 3/0697 370/503 |
| 2013/0003757 A1 | 1/2013 | Boatright et al. | |
| 2015/0365337 A1* | 12/2015 | Pannell | H04J 3/0697 370/503 |
| 2016/0112182 A1* | 4/2016 | Karnes | G06F 1/14 375/362 |
| 2020/0259896 A1* | 8/2020 | Sachs | H04W 12/06 |
| 2022/0224500 A1* | 7/2022 | Mula | H04L 43/50 |

\* cited by examiner

METHOD AND APPARATUS FOR DATA PLANE CONTROL OF NETWORK TIME SYNC PROTOCOL IN MULTI-HOST SYSTEMS

BACKGROUND INFORMATION

Time distribution to various accelerators in a System on a Chip (SoC) is important for satisfying various real time requirements, such as shaping, timestamping, and latency measurements. A common main timer in a smart NIC (Network Interface Controller) can be distributed via different techniques (e.g., bus distribution, serial distribution, etc.) to various accelerator blocks within the SoC. A common main or primary timer is useful to maintain a SoC based time. This can be synchronized to various network sources. Examples include: Time reference based on Institution of Electronic and Electrical Engineers (IEEE) 1588 via an Ethernet port, GPS, synchronous Ethernet from a port, and other schemes.

In existing implementations, the primary timer is controlled via a host (or multiple hosts) residing external to the SOC or a CPU that is local to the SoC. This is also alternatively referred to as control plane time synchronization protocol. The primary timer and the various distribution points need to stay frequency and phase aligned. Frequency and phase alignment allow the distribution points to be accurate with respect to the centralized primary timer. This allows, for example, accurate timestamping which is needed for SoCs in 5G wireless Radio Access Network (RAN) applications. Distribution of the primary timer to PHYs (Physical Layers) for local timestamping allows nanosecond (ns) accuracy.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
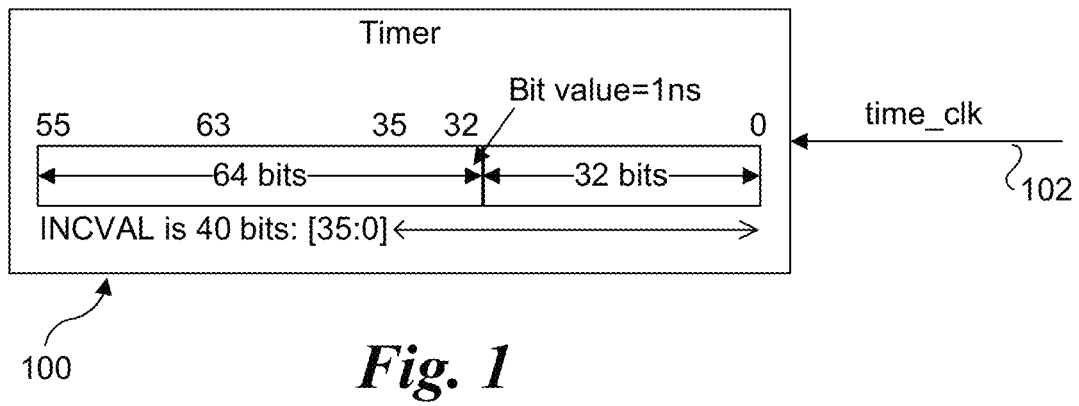
FIG. 1 is a diagram of an exemplary primary timer, according to one embodiment.

Embodiments of methods and apparatus for data plane control of network time sync protocol in multi-host systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, a network intellectual property block (network IP) in the data plane provides a synchronization (i_sync) signal control to a main timer. The (i_sync) signal control provides an increment and decrement feature that can be triggered many times a second. The range of adjustment is programmable, so it is possible to obtain coarse or fine timing changes depending on the network constraints. The decision of whether to increment or decrement the timer will depend on network constraints and can be adjusted in real-time on an ongoing basis. The hardware needed to make this decision of increment vs decrement resides in the network IP in the data plane.

FIG. 1 shows a 96-bit timer 100 that is used in the main timer block, according to one embodiment. In one embodiment the clock input (time_clk) 102 to 96-bit timer 100 is 500 MHz to 1 GHz, although this range is merely exemplary and non-limiting. When time_clk) 102 is an 800 MHz signal setting bit 32 adjusts the time output by approximately 1 ns. In one embodiment the increment value (INCVAL) is the lower 40 bits. INCVAL is used for both incrementing and decrementing the output of 96-bit timer 100 based on a 2-bit i_sync signal discussed below. Generally, bits 32-39 are used for adjustment of the main timer, in one embodiment.

The 2-bit i_sync signal is labeled i_sync[1:0] and is sent over a 2-wire interface. The [1:0] bit values are used to effect the following adjustments to the primary and secondary timers, in accordance with one embodiment:

0:0→no change
0:1→increment
1:0→decrement
1:1→no change

Generally, the amount of increment or decrement may be predefined (e.g., 1 ns) or may be adjusted using a register or the like that is associated with a timer or a shared register on a SmartNIC chip.

Figure 2:
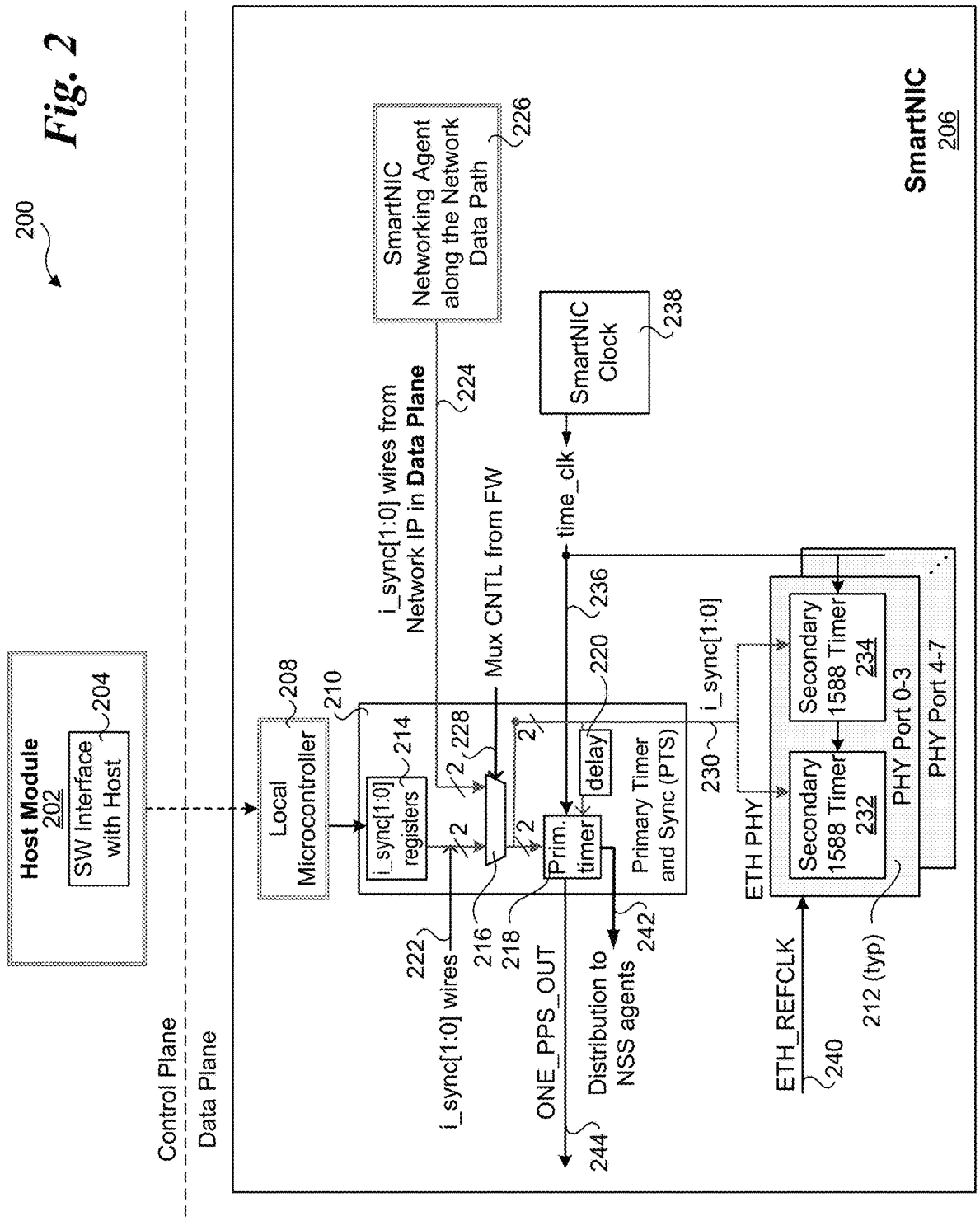
FIG. 2 is a schematic diagram showing selected components of a platform including a host module with a software interface operating in a software-based control plane in communication with a SmartNIC in the data plane.

FIG. 2 shows selected components of a platform 200 including a host module 202 with a software (SW) interface with host 204 operating in a software-based control plane in communication with a SmartNIC 206 in the data plane. SmartNIC 206 includes a local microcontroller 208, a primary timer and sync (PTS) block 210, and a plurality of Ethernet PHY ports 212. PTS block 210 includes i_sync[1:0] registers 214, a multiplexer (mux) 216, a primary timer 218, and a delay 220.

i_sync[1:0] registers 214 are programmed by local microcontroller 208 based on an input received from SW interface with host 204. The output of i_sync[1:0] registers 214 is a 2-wire signal 222 comprising a 2-bit i_sync[1:0] value, which comprises a first input to mux 216. The second input for mux 216 is an i_sync[1:0] signal 224 from the data plane that is output from a SmartNIC networking agent 226 that is part of the network data path.

A mux control signal 228 provided by firmware (FW) on SmartNIC 206 is used to select whether i_sync[1:0] signal 230 output by mux 216 is i_sync[1:0] signal 222 that is controlled by software in the control plane or i_sync[1:0] signal 224 that is provided by SmartNIC networking agent 226, which is implemented in hardware on SmartNIC 206. i_sync[1:0] signal 230 is provided to both primary timer 218 and to each of the secondary 1588 timers in Ethernet PHY ports 212, such as depicted by secondary 1588 timers 232 and 234 in this example. As further shown, each of primary timer 218 and secondary 1588 timers 232 and 234 receive a time_clk input 236 from a SmartNIC clock 238. Ethernet PHY ports 212 also receive an Ethernet reference clock (ETH_REFCLK) input 240.

Figure 3:
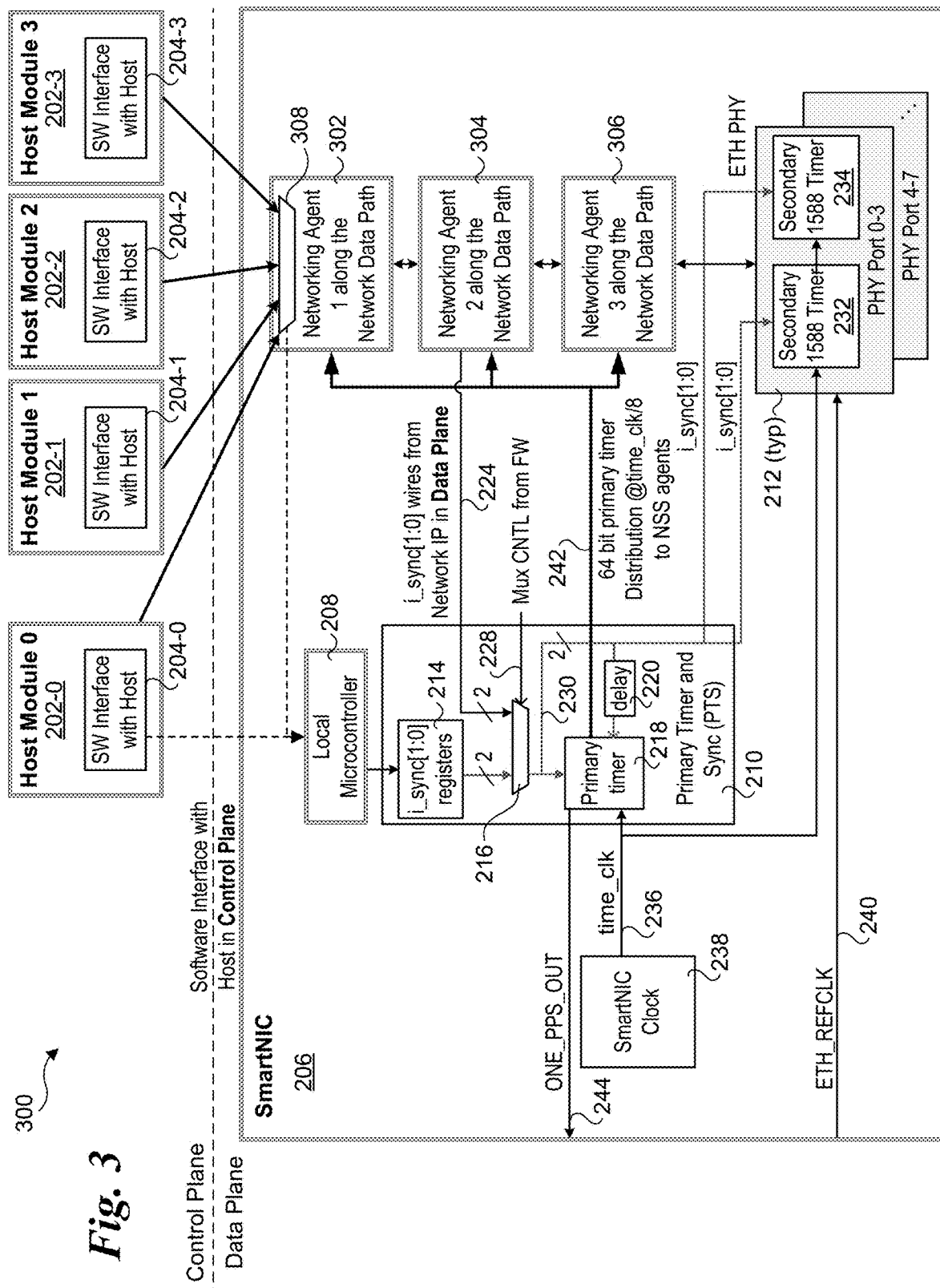
FIG. 3 is a schematic diagram illustrating further details of the SmartNIC of FIG. 2 implemented in a multi-host platform, according to one embodiment.

Primary timer 218 is used to provide time signals 242 to network sub-system (NSS) agents on SmartNIC 206, as further detailed in FIG. 3. Primary timer 218 also outputs a ONE_PPS_OUT signal 244, which is a signal comprising one pulse per second.

FIG. 3 shows a multi-host platform 300 including four host modules 202-0, 202-1, 202-2, and 202-3 with respective SW interfaces with hosts modules 204-0, 204-1, 204-2, and 204-3. FIG. 3 shows an exemplary set of the networking agents along the network data path, including networking agents 302, 304, and 306 (also labeled networking agents 1, 2, and 3). Networking agents 302, 304, and 306 are representative of a set of networking agents that would be implemented in pipeline; in this example, these networking agents are implemented for outbound packets. A similar set of networking agents (not shown) are implemented in a pipeline used for processing inbound packets.

Networking agent 302 is the first networking agent in the pipeline and is configured to receive inputs from each of host modules 202-0, 202-1, 202-2, and 202-3. Each host module comprises software that is executed on a respective host central processing unit (CPU). In one embodiment, data is transferred between a host central processing unit (CPU) and SmartNIC 206A over a PCIe (Peripheral Component Interconnect Express) link coupled between respective PCIe interface on the host CPU and SmartNIC (not shown). A mux 308 is shown in networking agent 302 to illustrate the capability of receiving data, such as PCIe messages, from multiple hosts and to also forward data that is destined for local microcontroller 208. In one embodiment, host module 202-0 is executed on the host CPU used to boot the multi-host platform.

Networking agent 304 correspond to SmartNIC networking agent 226 of FIG. 2, and outputs i_sync [1:0] signal 224 over a two-wire interface between networking agent 304 and mux 216. Networking agent 304 also corresponds to the network IP used for adjusting the primary and secondary timers during following an initial boot phase, as describe below with reference to FIG. 4.

Primary timer 218 output a 64-bit primary timer signal 242 that is distributed to the NSS agents on SmartNIC 206, as depicted by the signal distribution to networking agents 302, 304, and 306. In the illustrated embodiment, 64-bit primary timer signal 242 has a frequency of time_clk signal 236 divided by 8. Generally, the primary timer signal that is distributed to the NSS agents may be time_clk/n, where n is an integer of 4 or more (determined by physical design).

Figure 4:
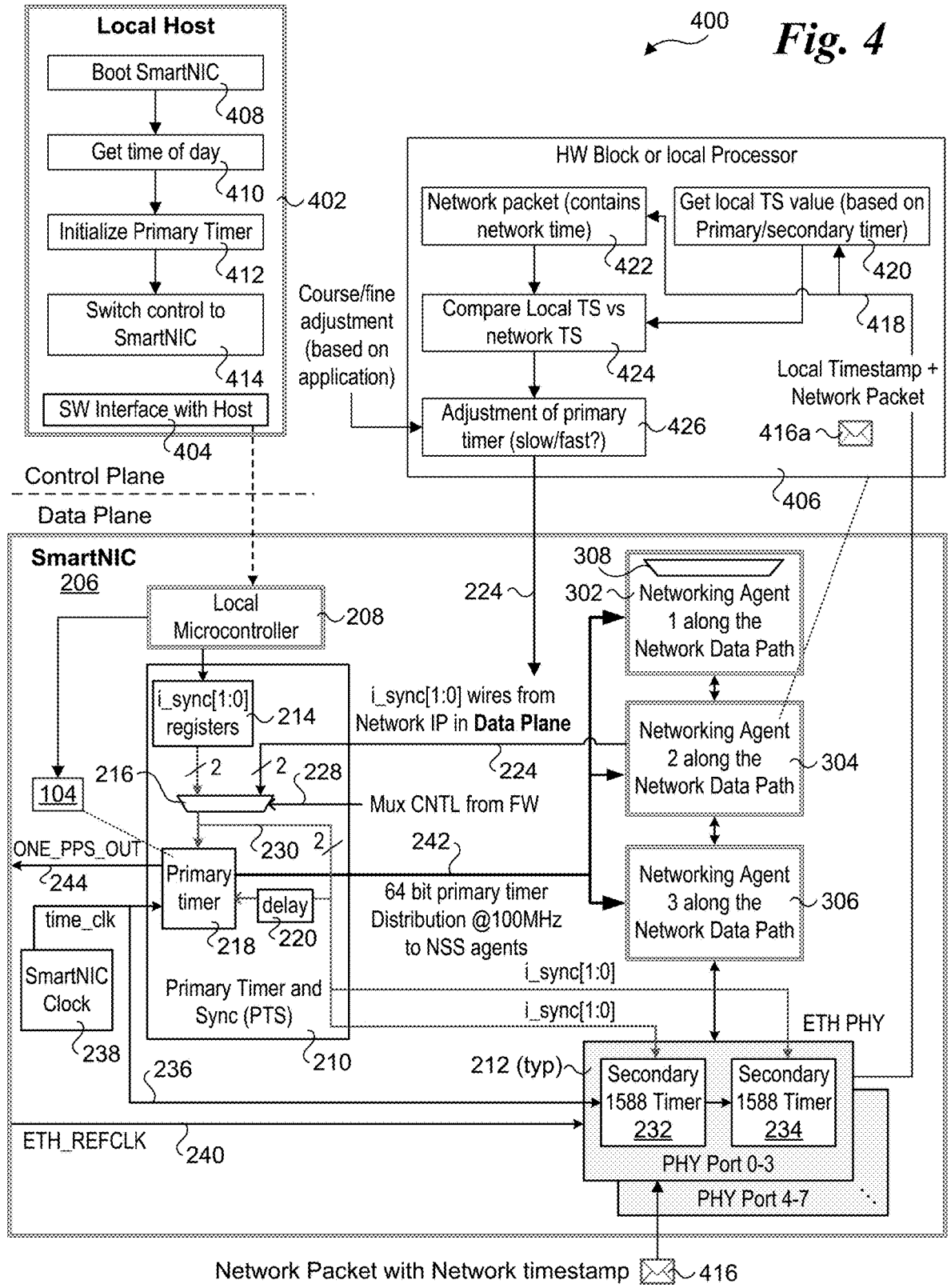
FIG. 4 is a combined schematic diagram with flowcharts illustrating operations performed during initialization of the SmartNIC and its primary timer and operations employed by an network IP on the SmartNIC during ongoing network operations to adjust the primary and secondary timers be synchronized with a network time, according to one embodiment

FIG. 4 shows selective components of a platform 400 including a local host 402 including a SW interface with host 404 coupled to a SmartNIC 206 via an interconnect, such a PCIe link. FIG. 4 also shows an embedded logic block 406 that is implemented in networking agent 304.

Local host 402 is used to bring up and initialize SmartNIC 206 in conjunction with initializing platform 400. This includes booting SmartNIC 206 in a block 408, getting the time of day in a block 410, initializing primary timer 218 in a block 412, and switching control to firmware on SmartNIC 206 in a block 414. During the SmartNIC boot process SmartNIC 206 is initialized, which includes loading firmware on the SmartNIC into local memory as illustrated below in FIG. 5. Local host 402 can get the time of day via various means, such as using a clock on the Host CPU used to execute the local host software or via a standard networking mechanism.

Timer Control Mechanisms

From a flow perspective, the PTS will be brought out of reset by a secure entity such as a local host residing in the control plane. During this initial phase, software running in the control plane is used to set up the initial time base setting for the network. Subsequently, once the network data plane is brought of reset, one of the network IPs can take control of the primary timer and dynamically adjust the system times in consideration of real-time constraints to satisfy the time stamping requirements of the network.

In one aspect, a configuration register is employed to select a time step size for incrementing and decrementing the time. This configuration register is implemented in the primary timer as well as other distribution points.

Based on a 100 MHz clock frequency, this scheme may be used for 100 million changes per second via the 2-wire interface to account for misalignment by up to +/−1 second. When combined with a 1 ns time step size, up to 100 million adds of 1 ns or 100 million subtractions of 1 ns (or combination of the two events). The provides a maximum adjust range of +0.1 sec/sec or −0.1 sec/sec. For example, a misalignment of 1 second will take approximately 10 seconds to correct.

Figure 1A:
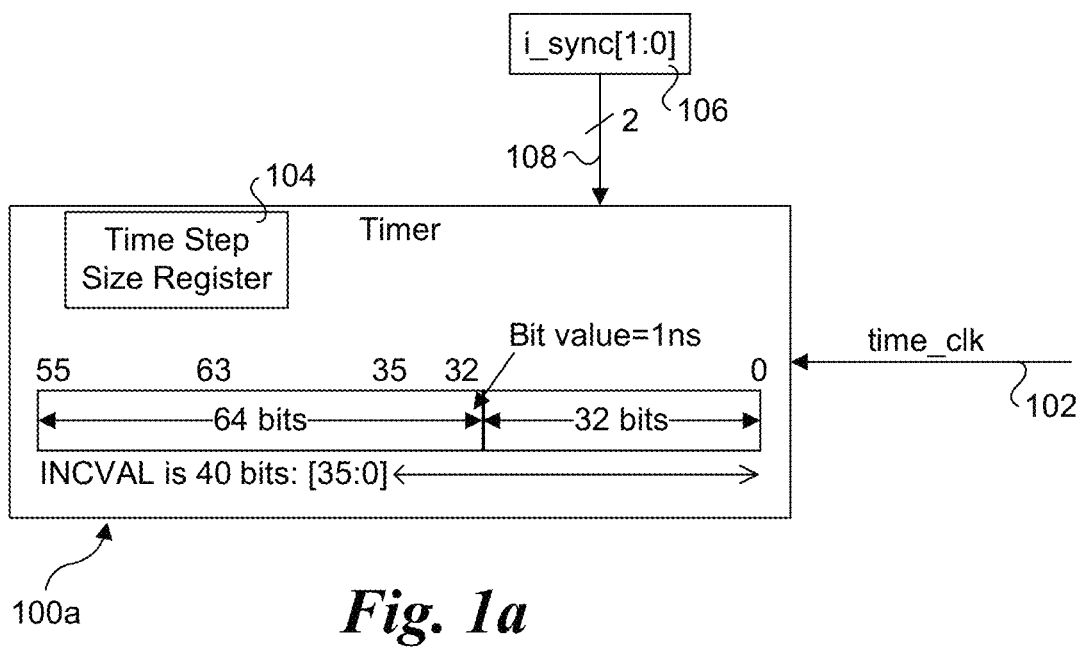
FIG. 1a is a diagram of a modified version of the primary timer of FIG. 1 including a time step size register.

As example of a 96-bit timer 100a including a time step register 104 is shown in FIG. 1a. As shown, the inputs to 96-bit timer 100a are time_clk 102 and a 2-bit i_sync[1:0] signal 106 sent over a 2-wire interface 108.

Returning to FIG. 4, primary timer 218 is initialized in the following manner, according to one embodiment. Local host 402 sends data to microcontroller 208 to set an initial value for primary timer 218 via a datapath from the microcontroller to the primary timer (not shown). Optionally, primary timer 208 may have predetermined initial value that is used when it is powered up using either a cold boot or coming out of a sleep state. Local host 402 also may send data to microcontroller 208 to program a time step value in time step size register 104. Subsequently, local host 402 sends data to microcontroller 208 to update i_sync[1:0] registers 214 to increase or decrease the primary timer value. During this initial phase the mux control from FW 228 sets the output of mux 216 to the output from i_sync[1:0] registers 214.

In one embodiment, time step size register 104 employs an m-bit value, such as a 2-bit or 3-bit value. For example, for a 2-bit time step size register the following exemplary mappings may be used:

00→ns change per 01/10 occurrence
01→8 ns change per 01/10 occurrence
10→128 ns change per 01/10 occurrence
11→1024 ns change per 01/10 occurrence At some point following this initial phase, timer control is switched to the SmartNIC, as depicted by block 414. During this second ongoing run-time phase, embedded logic 406 is networking agent 304 is used to dynamically adjust the primary and secondary clocks in view of current network constraints. The process proceeds as follows.

Periodically, a network timestamp packet 416 will be received at one or more of PHY ports 212. For example, depending on the network configuration, every $i^{th}$ packet will be a network timestamp packet. An example value for i is 100. As depicted by a signal path 418, two pieces of information will be provided from a PHY port 212 receiving the network timestamp packet: the network timestamp packet and a local timestamp generated by the PHY port corresponding to a local time at which the network timestamp packet is received. For example, under platform 400 the local timestamp is generated using a secondary 1588 timer. Optionally, a signal from primary timer 218 may be employed.

In one embodiment, a first header field in network timestamp packet 416 contains the network timestamp value, and the local timestamp value is written to a second header field to create a network timestamp packet 416a. Network timestamp packet 416a with the local timestamp is then forwarded to network agent 304.

Internally within embedded logic 406, either network timestamp packet 416a is provided to each of blocks 420 and 422, or otherwise another logic block (not shown) is used to extract the local timestamp value from network timestamp packet 416a and provides it to block 420. Block 420 gets or extracts the local timestamp value and provides it as an input to a block 424. In parallel, block 422 extracts the network timestamp value from network timestamp packet 416a and provides it as a second input to block 424. Block 424 then compares the local timestamp value with the network timestamp value. Based on the result of this comparison, the primary timer is adjusted in a block 426. Under embodiments supporting fine and coarse adjustments, a fine or course adjustment input is provided to block 426. Block 426 then outputs a 2-bit i_sync[1:0] value to mux 216 corresponding to i_sync[1:0] signal 224. As an option, the course or fine adjustment may be used by block 426 to program time step registers 104 on primary timer 218 and any timer distribution point.

Similar processing of network timestamp packets 416 is performed on an ongoing basis, enabling PTS 210 to adjust primary timer 218 and applicable secondary timers (e.g., secondary 1588 timers 232 and 234) on SmartNIC 206.

Example Platform/Computing Systems

Figure 5:
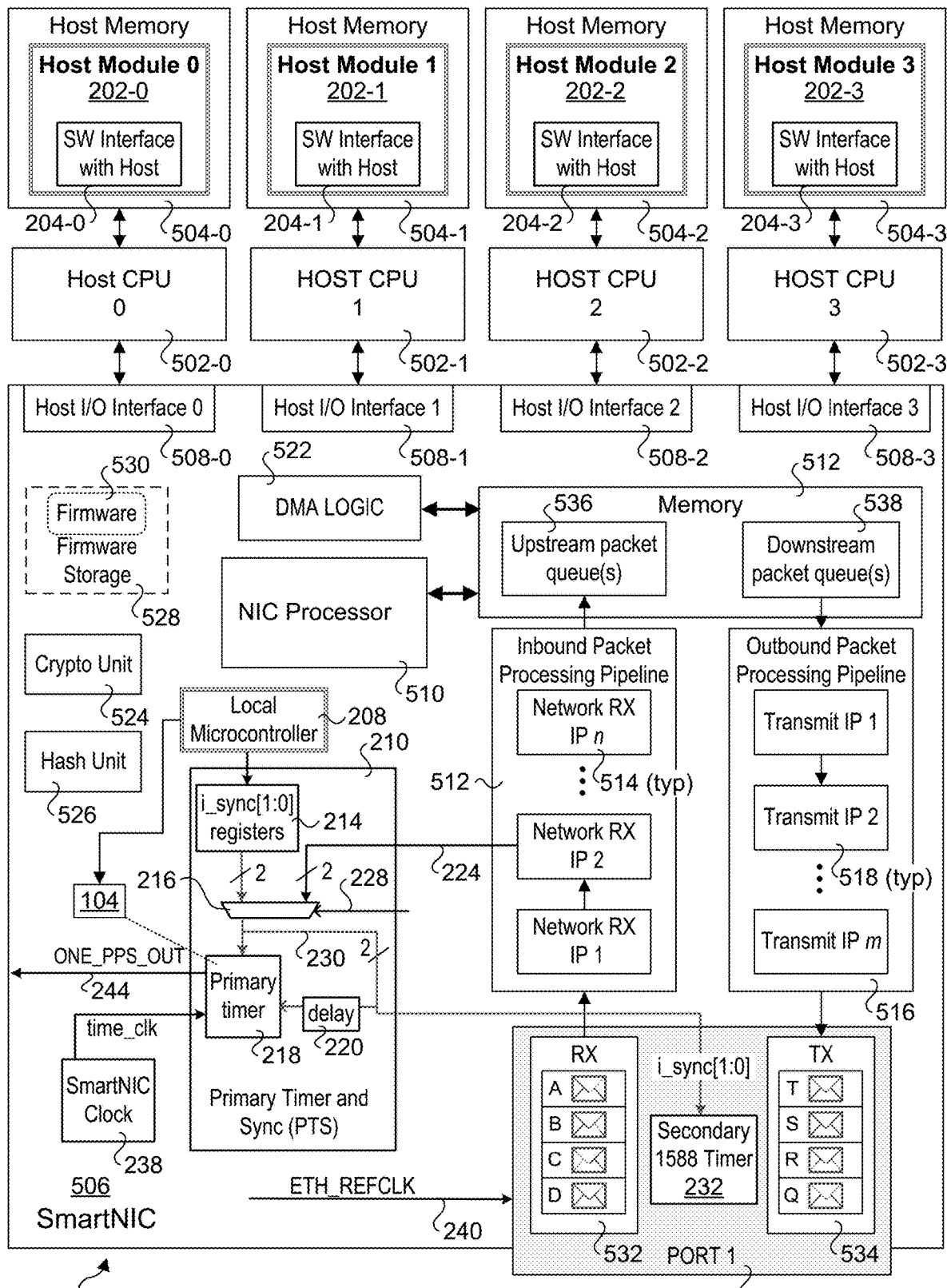
FIG. 5 is a schematic diagram of a first multi-host computing system employing a SmartNIC configured to sync its primary and secondary timers with a network time.

FIG. 5 shows a first example of a multi-host computing system 500 employing a SmartNIC 506 configured to sync its primary and secondary timers with a network time in accordance with the foregoing embodiments. In this example, computing system 500 includes four hosts, each including a respective host CPU 500-$x$, where x is the CPU number (also depicted as host CPUs 0, 1, 2, and 3) coupled to host memory 504-$x$. Each host includes a respective host module 202-$x$ with SW interface with host 204-$x$.

Each of the host CPUs is communicatively coupled to a host I/O interface 508-$x$ on SmartNIC 506. In one non-limiting example, host I/O interfaces comprise PCIe interfaces. In the case of PCIe interfaces, these interfaces would be connected to a PCIe bus (aka PCIe link) coupled to a PCIe root port in a host CPU. Alternatively, in the blade sever embodiment discussed below for FIG. 6, the PCIe bus is shared by multiple server blades. Accordingly, SmartNIC 506 would need only a single host I/O interface.

SmartNIC 506 includes the circuitry shown for SmartNIC 206 in the Figures above, some of which is shown in FIG. 5. In addition, SmartNIC 506 includes an embedded NIC processor 510 coupled to memory 512, an inbound packet processing pipeline 514 comprising n network receive (RX) IP block 514, an outbound packet processing pipeline 516 comprising m network transmit (TX) IP block 518, and one or more network ports 520. SmartNIC 506 also includes DMA logic 522, which is representative of circuitry and logic on-board the NIC for facilitating Direct Memory Access (DMA) transfers between host memory 504-$x$ and SmartNIC 506.

NIC 506 may also include embedded "accelerator" hardware or the like that is used to perform packet processing operations, such as flow control, encryption, decryption, etc. For example. NIC 506 may include one or more crypto blocks configured to perform encryption and decryption in connection with network traffic, as depicted by a crypto unit 524. NIC 506 may also include a hash unit to accelerated hash key matching in connection with packet flow lookups, such as depicted by a hash unit 526.

SmartNIC 506 may further include firmware storage 528 in which firmware 530 is stored. Firmware 530 comprises instructions that are executed by NIC processor 510 to implement various functions supported by SmartNIC 506. Optionally, firmware 530 may be stored in a storage device external to NIC 506 (not shown) and accessed from that storage device. As another option, a portion of firmware 530 may be loaded from a remote storage device over a network using either an in-band or out-of-band connection.

In the illustrated example, network port 520 is an Ethernet port including a RX port 532 and TX port 534. RX port 532 includes one or more RX buffers in which received packets (e.g., packets A, B, C, D) are buffered prior to being processed by inbound packet processing pipeline 512. TX port 534 includes one or more TX buffers in which packets to be transmitted (e.g., packets Q, R, S, T) are buffered following processing performed by outbound packet processing pipeline 516. Network port 520 also includes circuitry and logic for implementing the Physical Layer (PHY Layer 1), and Media Access Channel (MAC) (Layer 2) in accordance with one or more applicable Ethernet protocols, including more recent Ethernet protocols supporting 25, 50, 100, 200 and/or 400 Gigabits per second (Gb/s) bandwidths.

Under various embodiments, SmartNIC 506 may also implement Network Layer 3 and Transport Layer 4 in the inbound and outbound packet processing pipelines 512 and 516. Otherwise, Network Layer 3 and Transport Layer 4 may be implemented in network stacks running on the hosts.

Following inbound packet processing, the RX packets are buffered or queued in one or more upstream packet queue(s) 536 in memory 512 to be subsequently forwarded to applicable destination hosts. Packets to be sent out are buffered in one or more downstream packet queue(s) 538 in memory 512 prior to being processed by outbound packet processing pipeline 516.

For simplicity, memory 512 is shown as a single block. In practice, SmartNIC 506 may employ more than one memory device. Memory 512 is also representative of different types of memory, such as SRAM and DRAM, and is part of a memory subsystem for SmartNIC 506. Aspects of the memory subsystem, such as a memory controller on NIC processor 510 are not shown to avoid clutter; however, persons skilled in the art will understand SmartNIC 506 would include these features. In addition, the memory space for memory 512 may be portioned to support different access mechanisms, for security measures, etc. For example, a portion of memory 512 may be implemented to support Memory-Mapped Input-Output (MMIO), enabling data to be written to or read from the MMIO portion by software running on the hosts.

In general, the functionality for the blocks illustrated for SmartNIC 506 may be implemented using some form of embedded logic. Embedded logic generally includes logic implemented in circuitry, such as using an FPGA (Field Programmable Gate Array) or using preprogramed or fixed hardware logic (or a combination of pre-programmed/hard-coded and programmable logic), as well as firmware executing on one or more embedded processors, processing elements, engines, microcontrollers or the like. For illustrative purposes, an example of firmware executing on NIC processor 510 is shown in FIG. 5, but this is not meant to be limiting. NIC processor 510 is a form of embedded processor that may include multiple processing elements, such as cores or micro-engines or the like.

Generally, a multi-host system may employ two or more hosts. In some implementations, the multi-host system is a multi-socket server with two or more sockets, each associated with a respective CPU/SoC coupled to local memory. Other configurations such as blade servers and servers employing server modules may also be used.

Figure 6:
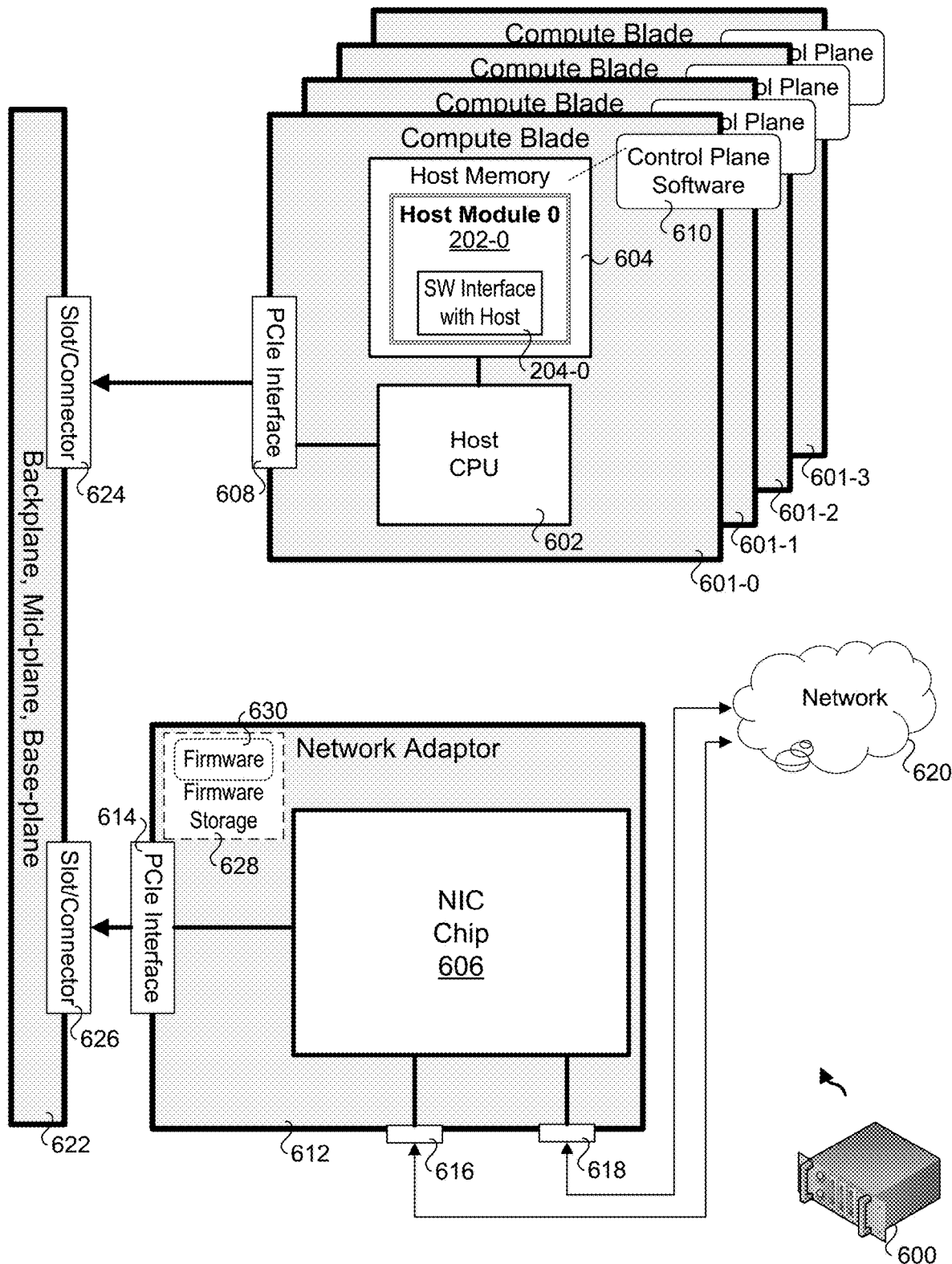
FIG. 6 is a schematic diagram of a second multi-host computing system comprising a blade server including multiple compute blades and a network adaptor installed in slots or mating connectors of a backplane, mid-plane, or baseplane, according to one embodiment.

FIG. 6 shows a second exemplary computing system comprising a blade server 600 in which the aspects of the foregoing embodiments may be implemented. The blade server includes four compute blades 601-0, 601-1, 601-2, and 601-3, each having a CPU 602 coupled to host memory 604 and coupled to a PCIe interface 608. During operation of blade server 600, control plane software 610 is loaded into host memory 604 and executed by CPU 602. Blade server 600 includes one or more network adaptors 612 include a NIC chip 606 coupled to a PCIe interface 614 and coupled to one or more Ethernet ports, as depicted by ports 616 and 618, which are connected to a network 620. Blade server 600 includes a backplane, mid-plane or base-plane 622 having multiple expansion slots or connectors, as depicted by slot/connectors 624 and 626. Each of compute blades 601-0, 601-1, 601-2, and 601-3 and network adaptor 612 are installed in a respective expansion slot or include a connecter that couples to a mating connector on backplane, mid-plane or base-plane 622.

In general, a blade server implementation may have two or more compute blades and one or more network adaptors. Computing system using server modules rather than blades may be used in a similar manner. Generally, NIC chip 606 includes circuitry and embedded logic similar to SmartNIC 506 discussed above. In some embodiments, network adaptor 612 may include a firmware storage device 628 that is separate from NIC chip 606 in which firmware 630 is stored. During operating, firmware 630 is read from firmware storage device 628 and loaded into memory on NIC chip 606.

Figure 7:
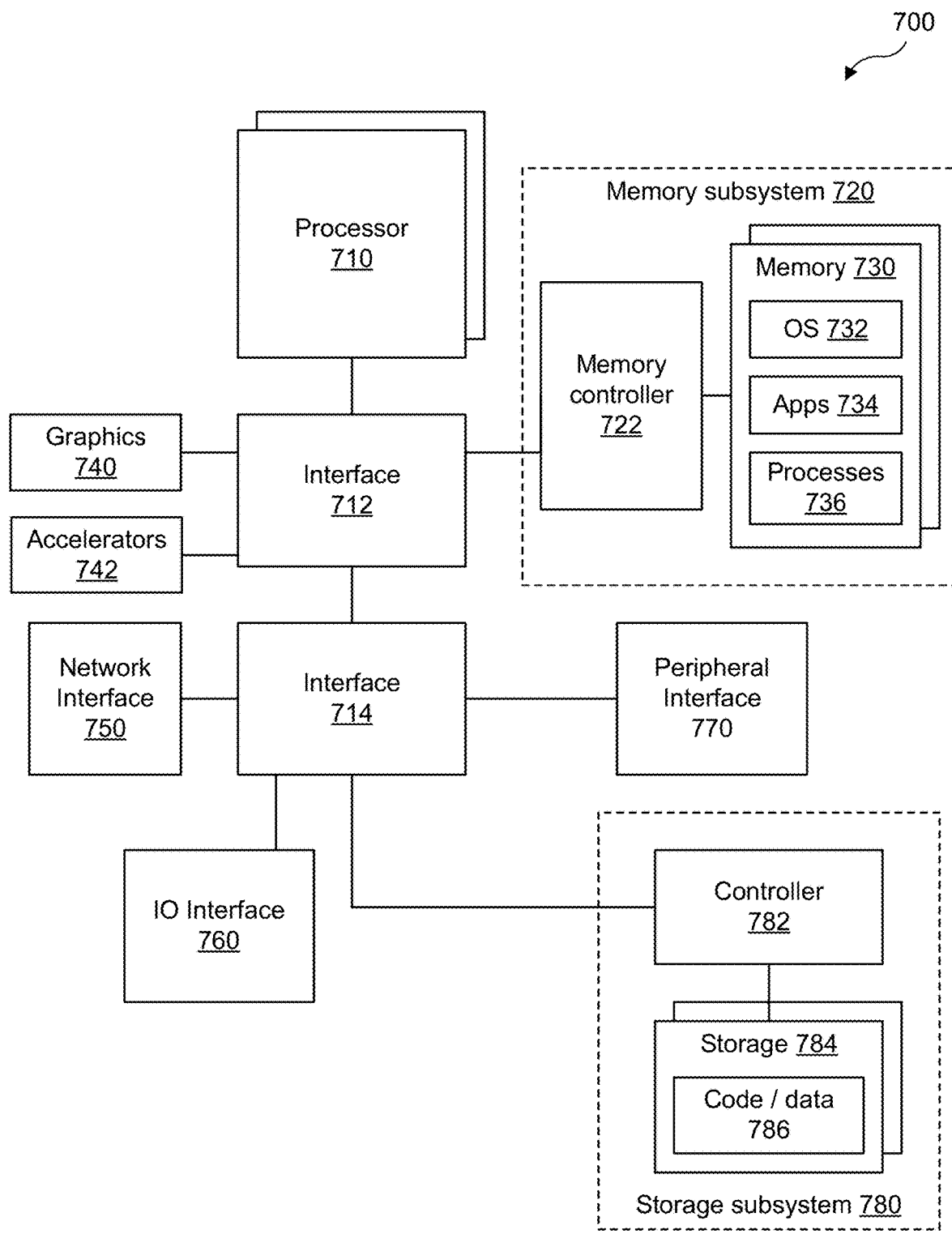
FIG. 7 is a is a diagram of another example computing platform or system that may be implemented with aspects of the embodiments described and illustrated herein.

FIG. 7 depicts a third example of a computing system 700 in which aspects of the embodiments disclosed herein may be implemented. Computing system 700 includes one or more processors 710, which provides processing, operation management, and execution of instructions for computing system 700. Processor 710 can include any type of microprocessor, central processing unit (CPU), graphics processing unit (GPU), processing core, multi-core processor or other processing hardware to provide processing for computing system 700, or a combination of processors. Processor 710 controls the overall operation of computing system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, computing system 700 includes interface 712 coupled to processor 710, which can represent a higher speed interface or a high throughput interface for system components that needs higher bandwidth connections, such as memory subsystem 720 or optional graphics interface components 740, or optional accelerators 742. Interface 712 represents an interface circuit, which can be a standalone component or integrated onto a processor die. Where present, graphics interface 740 interfaces to graphics components for providing a visual display to a user of computing system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Memory subsystem 720 represents the main memory of computing system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in computing system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for computing system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that computing system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, computing system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides computing system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720.

In one example, computing system 700 includes one or more IO interface(s) 760. IO interface 760 can include one or more interface components through which a user interacts with computing system 700 (e.g., audio, alphanumeric, tactile/touch, or other interfacing). Peripheral interface 770 can include any hardware interface not specifically mentioned above. Peripherals refer generally to devices that connect dependently to computing system 700. A dependent connection is one where computing system 700 provides the software platform or hardware platform or both on which operation executes, and with which a user interacts.

In one example, computing system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination.

In an example, computing system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

In addition to computing systems with processor or CPUs, the teaching and principles disclosed herein may be applied to computing systems and platforms. Other Processing Units (collectively termed XPUs) including one or more of Graphic Processor Units (GPUs) or General Purpose GPUs (GP-GPUs), Tensor Processing Unit (TPU) Data Processor Units (DPUs), Infrastructure Processing Units (IPUs), Artificial Intelligence (AI) processors or AI inference units and/or other accelerators, FPGAs and/or other programmable logic (used for compute purposes), etc. While some of the diagrams herein show the use of processors, this is merely exemplary and non-limiting. Generally, any type of XPU may be used in place of a CPU or processor in the illustrated embodiments. Moreover, as used in the following claims, the term "processor" is used to generically cover various forms of processors including CPUs and different forms of XPUs.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'i', 'm', 'n', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A network interface controller (NIC), configured to be implemented in a network data plane when installed in a computing system comprising one or more hosts having respective central processing units (CPUs) used to execute software to implement a network control plane associated with the network data plane, comprising:
   a primary timer;
   one or more network ports; and
   one or more secondary timers associated with a respective network port,
   wherein the NIC is configured to,
      receive, at a network port, a network time packet having a network timestamp associated with a network time;
      associate a local timestamp generated by the secondary timer in the network port with the network time packet;
      compare the local timestamp with the network timestamp; and
      adjust the primary timer based on the comparison of the local timestamp and the network timestamp.

2. The NIC of claim 1, further comprising a network intellectual property block (network IP) comprising one of a plurality of networking blocks along a network data path in the data plane and configured to:
   receive a plurality of network time packets associated with network timestamps and local timestamps;
   compare the local timestamps with the network timestamps; and
   provide signals to the primary timer to adjust a time of the primary timer based on the comparisons of the local timestamps and the network timestamps to synchronize the primary timer with the network time.

3. The NIC of claim 2, wherein the Network IP is further configured to provide an adjustment signal to at least one secondary timer to adjust a time of the secondary timers based on the comparisons of the local timestamps and the network timestamps.

4. The NIC of claim 3, wherein the Network IP is configured to provide adjustment signals to the primary timer and the at least one of the secondary timers in parallel.

5. The NIC of claim 2, wherein the adjustment signal comprises indicia to increment or decrement the primary timer.

6. The NIC of claim 2, further comprising a host interface to communicate with the one or more host processors, wherein the NIC is further configured, when installed in the computing system, to:
initialize the primary timer in response to inputs received from a host processor via the host interface; and
transfer control of the primary timer to the Network IP.

7. The NIC of claim 2, further comprising a plurality of networking blocks along a network data path in the data plane, wherein the Network IP comprises or is implemented in one of the plurality of networking blocks.

8. The NIC of claim 1, wherein the primary timer includes a register configured to store a value specifying an amount the primary timer is incremented or decremented, and wherein the primary timer is configured to:
receive an adjustment signal to increment or decrement a timer value; and
increment or decrement the timer value as a function of the value in the register.

9. The NIC of claim 1, wherein the primary clock is enabled to be adjusted by approximately 1 nanosecond or less.

10. A method implemented by a network interface controller (NIC) installed in a computing system having one or more host central processing units (CPUs) executing software to implement a control plane associated with a data plane implemented by the NIC, comprising:
receiving, at a network port on the NIC, a network time packet having a network timestamp associated with a network time;
generating, via a secondary timer in the network port, a local timestamp corresponding to a local time when the network time packet is received;
comparing the local timestamp with the network timestamp; and
adjusting a primary timer on the NIC based on the comparison of the local timestamp and the network timestamp.

11. The method of claim 10, further comprising:
receiving, at a network intellectual property block (network IP) on the NIC, a plurality of network time packets associated with network timestamps and local timestamps;
comparing the local timestamps with the network timestamps; and
providing adjustment signals to the primary timer to adjust a time of the primary timer based on the comparisons of the local timestamps and the network timestamps to synchronize the primary timer with the network time.

12. The method of claim 11, further comprising providing the adjustment signals to the primary timer and to a secondary timer to adjust the time of the primary timer and secondary timer in parallel.

13. The method of claim 11, wherein the adjustment signal comprises a 2-bit value indicating whether to increment, decrement, or not adjust the primary timer.

14. The method of claim 11, wherein the NIC includes a host interface to communicate with the one or more host processors, further comprising:
initializing the primary timer in response to inputs received from a host processor via the host interface; and
transfer control of the primary timer to the Network IP.

15. The method of claim 10, wherein the primary timer includes a register configured to store a multi-bit value specifying an amount the primary timer is incremented or decremented, further comprising:
programming the register with a value;
receiving an adjustment signal to increment or decrement a timer value for the primary timer; and
incrementing or decrementing the timer value as a function of the value in the register.

16. A computing system, comprising:
one or more hosts, each including a central processing unit (CPU) coupled to memory;
a network interface controller (NIC), operatively coupled to each host and including,
one or more network ports;
a primary timer; and
one or more secondary timers associated with a respective network port,
wherein the NIC is configured to,
receive, at a network port, a network time packet having a network timestamp associated with a network time;
generate a local timestamp using a secondary timer associated with the network port in conjunction with receiving the network time packet;
compare the local timestamp with the network timestamp; and
adjust the primary timer based on the comparison of the local timestamp and the network timestamp to synchronize the primary timer with the network time.

17. The computing system of claim 16, wherein the NIC further includes a network intellectual property block (network IP) comprising one of a plurality of networking blocks along a network data path in the data plane and configured to:
receive a plurality of network time packets having associated network timestamps and local timestamps;
compare the local timestamps with the network timestamps; and
provide signals to the primary timer to adjust a time of the primary timer based on the comparisons of the local timestamps and the network timestamps.

18. The computing system of claim 17, wherein the Network IP is further configured to provide an adjustment signal to at least one secondary timer to adjust a time of the secondary timers based on the comparisons of the local timestamps and the network timestamps.

19. The computing system of claim 17, wherein the adjustment signal employs a 2-bit wire protocol used to increment and decrement the primary timer.

20. The computing system of claim 16, wherein the NIC further comprises a host Input/Output (I/O) interface coupled to a first host, wherein the system if configured to:
initialize the primary timer under control of the first host: and
transfer control of the primary timer to the NIC.

* * * * *